United States Patent [19]

Rowe, deceased

[11] 3,934,998
[45] Jan. 27, 1976

[54] NECK RING CARTRIDGE FOR GLASSWARE MACHINE

[75] Inventor: George E. Rowe, deceased, late of Wethersfield, Conn., by Selma S. Rowe, executrix

[73] Assignee: Emhart Corporation, Hartford, Conn.

[22] Filed: June 26, 1974

[21] Appl. No.: 483,284

[52] U.S. Cl. .................... 65/172; 65/235; 65/241; 65/359; 65/361; 65/232
[51] Int. Cl.² .......................................... C03B 9/00
[58] Field of Search ............. 65/232, 235, 241, 359, 65/361, 172

[56] References Cited
UNITED STATES PATENTS

| | | | |
|---|---|---|---|
| 2,702,444 | 2/1955 | Rowe | 65/235 X |
| 3,233,999 | 2/1966 | Mumford | 65/359 |
| 3,241,941 | 3/1966 | Abbott et al. | 65/241 |
| 3,244,499 | 4/1966 | Wiley | 65/361 X |
| 3,573,027 | 3/1971 | Nuzum, Sr. | 65/235 |

*Primary Examiner*—S. Leon Bashore
*Assistant Examiner*—Frank W. Miga
*Attorney, Agent, or Firm*—McCormick, Paulding & Huber

[57] ABSTRACT

The neck ring arms of a Hartford I. S. type glassware forming machine section are adapted to be oscillated between a blank and a blow station, and also to move toward and away from one another in order to cooperate with one another and with a blank mold at the blank side of the machine, and to release a partially formed parison at the blow side of such a machine. In a triple gob configuration, where three such neck ring molds are provided, cartridges are disclosed for conveniently mounting the six neck ring mold segments for quick assembly with the associated neck ring arms. The cartridges can be quickly removed with a minimum downtime to the machine section, and the neck ring mold segments bench-assembled in the cartridge at the leisure of the machine operator.

2 Claims, 4 Drawing Figures

NECK RING CARTRIDGE FOR GLASSWARE MACHINE

BACKGROUND OF THE INVENTION

In a Hartford I. S. type glassware forming machine each individual section has one or more blank molds into which one or more gobs of molten glass are deposited for the purpose of forming a preliminary parison or parisons. These parisons are formed inverted, and the neck portions of the parisons are actually formed to final shape in a neck ring mold at the blank side of the machine. The neck ring mold is then used to transfer the parisons to the blow side of the machine for the final forming step. The parisons are released at the blow side for this purpose, a blow head being lowered onto the blow mold in order to form the parisons into shape dictated by the blow molds after the neck ring molds have been returned to the blank side to cooperate with the blank mold in forming another group of parisons as the first group of articles are being final formed.

The mechanism for transferring the neck ring molds between the blank and the blow side of the machine section comprises left and right hand neck ring arms, the inner ends of which arms are mounted to a hub or neck ring structure so as to be oscillatable together, that is between the blank and blow mold stations or sides of the machine section. This hub structure, or neck ring mechanism, also includes means for moving these arms toward and away from one another to release the parisons at the blow station. Conventionally, the neck ring mold halves or segments are mounted directly to these arms by clamping screws or the like. However, with the advent of double and triple gob operation for the Hartford I. S. type glassware machine the removal for replacement or repair of the six neck ring mold halves required in a triple gob configuration has led to excessive downtimes in the individual machine section concerned. The purpose of the present invention is to avoid such excessive downtime in the glassware forming machine due to removal for replacement or repair of the various neck ring mold segments.

SUMMARY OF THE INVENTION

This invention relates generally to glassware forming machines, and deals more particularly with an improved cartridge construction for housing the various neck ring mold segments provided in such a glassware forming machine.

The general object of the present invention is to provide a neck ring mold cartridge construction which is capable of conveniently assembling the various neck ring mold segments so that they can be "bench mounted", each such cartridge being received in a channel defined for this purpose in its associated neck ring arm, and a quick disconnect latching means being provided to secure the cartridge in its associated arm.

DETAILED DESCRIPTION

In a typical Hartford I. S. type glassware forming machine the mechanism for oscillating a pair of neck ring arms from and to the blank and blow side station of an individual section is well known in the art. For example, U.S. Pat. No. 2,702,444 issued to the inventor herein Feb. 22, 1955 shows a neck ring mechanism of this general type, that is, a mechanism and means for moving the individual neck ring arms toward and away from one another and between a blank and a blow station. The reader is referred to the above mentioned patent for a detailed description of this conventional portion of the present disclosure, such a mechanism being illustrated in schematic fashion herein.

Figure 1:
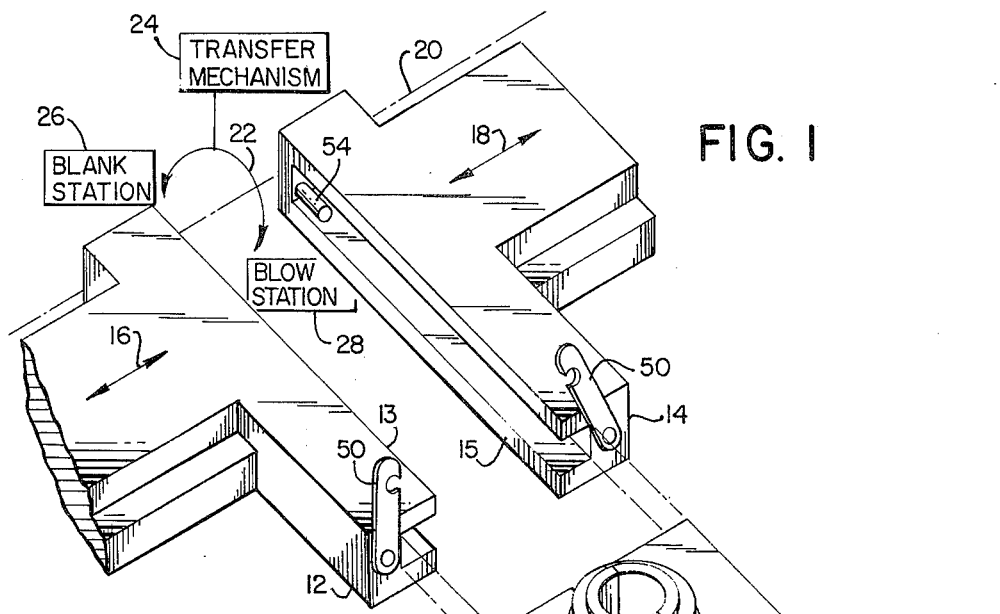
FIG. 1 is an exploded perspective view depicting known components in schematic fashion and illustrating the neck ring arms, the cartridge for supporting the various neck ring mold segments, and the latching arrangement for securing the cartridges in their associated neck ring arms.
Figure 2:
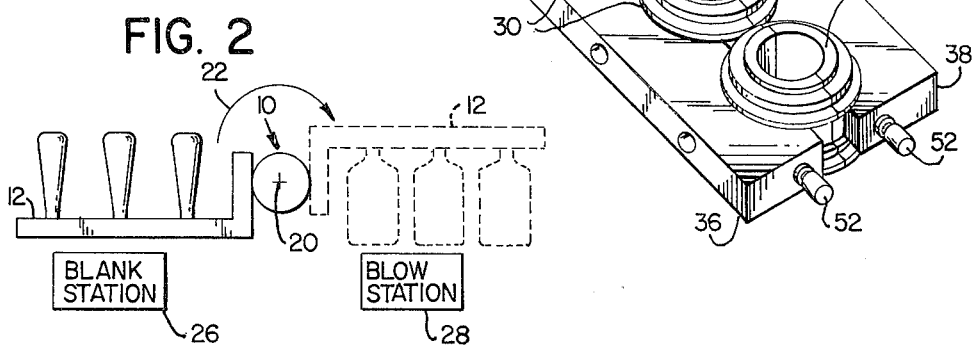
FIG. 2 is a schematic elevational view illustrating the conventional oscillatory motion of the neck ring arms whereby the parisons are transferred from the blank to the blow side of a typical glassware forming machine.

Briefly, such a mechanism, indicated generally at 10 in FIG. 2, is adapted to oscillate the neck ring arms 12 and 14 between the limit positions shown in FIG. 2 in solid and phantom lines. The neck ring mechanism 10 also includes means for moving the individual neck ring arms 12 and 14 toward and away from one another, as indicated generally by the arrows 16 and 18 respectively in FIG. 1. As disclosed in the above mentioned patent a typical neck ring mechanism for carrying out this motion may comprise a pair of opposed fluid pressure actuators each of which is slidably mounted on a horizontally extending rock shaft oscillatable on the axis 20. These actuators may have a common piston pinned or otherwise secured to the rock shaft. The cylinders are preferably splined to the shaft to prevent their rotation relative to the piston while permitting them to slide in the axial direction. A spring may be provided to urge these cylinders toward one another, and the neck ring arms preferably include inner portions which define flanges for attachment to gibs or the like defined for this purpose on the cylinders. The mechanism for oscillating the neck ring arms usually comprises a vertically oriented rack gear which is adapted to mesh with a pinion on the axis 20 of the horizontally extending rock shaft. Such a rack gear is typically actuated by a fluid actuator of conventional construction.

Figure 4:
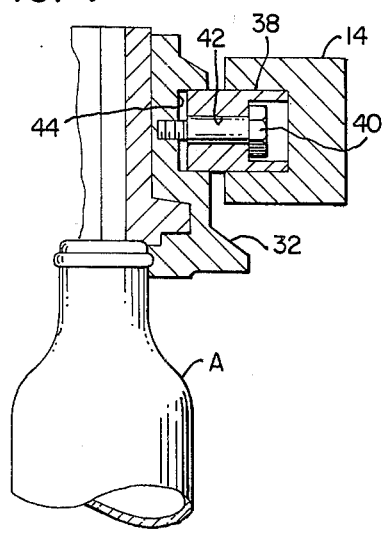
FIG. 4 is a vertical sectional view taken generally on the line 4—4 of FIG. 3.

Thus, the neck ring arms 12 and 14 are adapted to move toward and away from one another as indicated generally by the arrows 16 and 18, and in addition these arms are also adapted to move in unison with one another generally in the direction of the arrow 22 shown in FIGS. 1 and 2 so that the outer end portions of the arms are oscillated between the blank and blow stations (or sides) of a typical glassware forming machine section. The above described neck ring mechanism is of conventional construction and therefor is indicated schematically in FIG. 1 by reference numeral 24. The blank and blow stations are also depicted schematically by reference numerals 26 and 28. In the triple gob configuration shown in FIG. 2 several blank molds are provided at the blank station, and these are upwardly open to receive the gobs of glass from the gob distribution device (not shown). These gobs are formed into a preliminary shape called a parison at this blank station and only the neck portions of the parisons are formed to final shape at the blank side. The neck ring mold segments (six in number) illustrated generally at 30 and 32 in FIG. 1 final form the necks of the three articles. These neck ring mold segments are of conventional configuration, and are adapted to cooperate with the blank mold to define the neck or upper portion of the article as best shown in FIG. 4. By way of reference, an article is shown at A in FIG. 4 to relate the neck ring mold to this portion of a typical glassware article.

Figure 3:
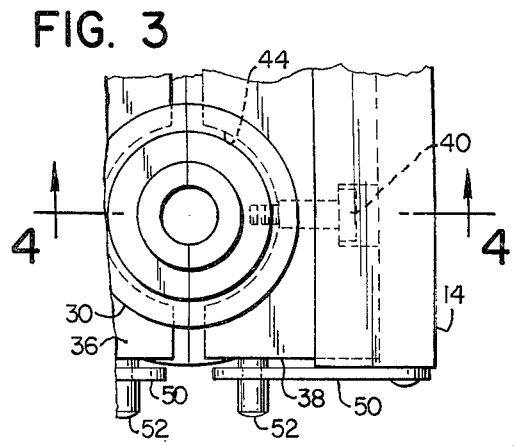
FIG. 3 is a plan view of a portion of the cartridge configuration depicted in FIG. 1 illustrating the manner in which the neck ring mold segment is connected to its associated cartridge.

In accordance with the present invention all of the various neck ring mold segments, or halves, are clamped in one or the other of two cartridges, 36 and 38, associated with each of the neck ring arms, 12 and 14 respectively. FIGS. 3 and 4 show the means for clamping each of the neck ring mold segments to its associated cartridge. Preferably, said means for clamping each neck ring mold segment 32 to its associated cartridge 38 comprises a clamping screw 40 slidably received in an opening 42 defined for this purpose in the cartridge 38 and threadably received in a threaded opening aligned therewith in the neck ring mold segment 32.

The cartridge 38 includes generally semi-circular locating surfaces 44 so shaped as to restrain the neck ring mold segment against vertical motion and to align such mold segment in the cartridge in order to permit said neck ring mold segment 32 to be secured thereto by a single clamping screw 40. As shown in FIG. 4 these locating surfaces 44, 44 are adapted to receive an annular groove in the neck ring mold segment, which groove has a vertical dimension corresponding to the thickness of the cartridge 38. Thus, the neck ring mold segment 32 is securely clamped in its associated cartridge as a result of the cooperative groove in the neck ring mold segment and the corresponding or complimentary shaped locating surface 44 on the cartridge itself.

Turning next to a more detailed description of the cartridge 38 and also, considering the method of assemblying these cartridges with their associated neck ring arms, FIG. 1 shows these neck ring arms, 12 and 14, to include longitudinally extending surfaces, 13 and 15 respectively, which surfaces face one another, and each of which surfaces defines at least one longitudinally extending channel opening for receiving its associated cartridge 36 and 38 respectively. Preferably, the channel shaped opening in each of the neck ring arms 12 and 14 is open outwardly to permit the associated cartridge, 36 or 38, to be slidably received therein. Quick disconnect attachment means in the form of latches and pins is provided for securing each of these cartridges in position. The latches 50, 50 are pivotally provided on the outer end of each of the neck ring arms 12 and 14, with cooperating pins 52, 52 being provided at the outer ends of each of the cartridges for receiving complimentary notches adjacent the free ends of the pivoted latches 50, 50.

A further feature of the present invention is the provision of cooperating male and female locating means defined in part in the neck ring arms, adjacent the inner ends of the channel openings, and in part in the cartridges themselves so as to properly locate the inner ends of the cartridges as they are received in these channels. As shown in FIG. 1 longitudinally extending pins 54 extend into the end of the channel opening in each of the neck ring arms, and these pins are slidably received in corresponding openings provided for this purpose at the inner ends of each of the cartridges 36 and 38. As so constructed and arranged it will be apparent that the cartridges 36 and 38 can be readily assembled and disassembled from their associated neck ring arm, all of this being accomplished with a minimum of downtime to the glassware forming machine section in which they are a component part. The cartridges themselves can be provided with the necessary neck ring mold segments for forming a particular style of glassware article while the cartridge is located on a bench, that is outside the environment of the glassware forming machine. On the other hand, cartridges can be provided in sufficient number to accommodate various neck ring mold segments and configurations with the result that the machine operator can remove and replace these portions of the mold structure in the machine in order to set-up his machine for forming a variety of glassware articles all with a minimum of downtime to the machine itself, and therefor, the overall operating efficiency of the resulting machine is much improved.

It is claimed

1. In a glassware forming machine of the type having a blank mold station wherein several preliminary parisons are formed, a blow mold station for final forming several glassware articles from these parisons, and a neck ring mechanism for transferring these parisons from the blank station to the blow station, the improvement comprising:
   a. left and right hand neck ring arms, both of which arms include inner portions for attachment to the neck ring mechanism whereby said arms are both movable from and to said blank and blow stations, and also individually movable toward and away from one another,
   b. said neck ring arms having longitudinally extending surfaces which face one another, each such neck ring arm surface defining at least one longitudinally extending channel open onto said surface,
   c. left and right hand neck ring cartridges, each such cartridge having one longitudinally extending side edge which is slidably received in an associated one of said neck ring arm channels, left and right hand neck ring mold segments for forming neck portions of the parisons at the blank station and for supporting the parisons during transfer to the blow station,
   d. said cartridge having facing portions which define locating surfaces for receiving said neck ring mold segments and neck ring mold mounting means for retaining said mold segments against said locating surfaces and in said cartridges, and
   e. quick disconnect attachment means for retaining said cartridges in said channels to facilitate the removal and replacement of said neck ring mold segments by removing the cartridges.

2. The combination defined in claim 1 wherein said cartridge locating surfaces are generally semicircular and cooperate with semicircular surfaces on said neck ring mold segments to prevent movement of the mold segments in at least one direction (vertical) and said neck ring mold mounting means comprising a single screw associated with each mold segment, said screws extending through openings (horizontal) in said cartridges and threadably received in aligned openings in said neck ring mold segments.

* * * * *